United States Patent
Croussore et al.

(10) Patent No.: US 7,369,779 B1
(45) Date of Patent: May 6, 2008

(54) REGENERATION OF OPTICAL PHASE MODULATED SIGNALS

(75) Inventors: Kevin A. Croussore, Orlando, FL (US); Guifang Li, Oviedo, FL (US); Cheolhwan Kim, Orlando, FL (US)

(73) Assignee: Research Foundation of the University of Central Florida, Orlando, FL (US)

( * ) Notice: Subject to any disclaimer, the term of this patent is extended or adjusted under 35 U.S.C. 154(b) by 349 days.

(21) Appl. No.: 11/181,399

(22) Filed: Jul. 14, 2005

(51) Int. Cl.
*H04B 10/02* (2006.01)

(52) U.S. Cl. ............. 398/176; 398/173; 398/174; 398/175; 398/177; 398/178; 398/179; 398/180; 398/181; 398/183; 398/33; 398/37; 359/332; 359/326; 359/333; 359/344; 385/1; 385/2; 385/4; 385/5; 385/15; 385/123; 385/122; 385/24; 385/27

(58) Field of Classification Search ........... 398/176, 398/175, 155, 178, 180, 183, 37, 173, 174, 398/177, 179, 33, 181; 385/27, 24, 122, 385/123, 1, 2, 4, 5, 15; 359/332, 326, 333, 359/344
See application file for complete search history.

(56) References Cited

U.S. PATENT DOCUMENTS 7,031,617 B2 * 4/2006 Zucchelli et al. ........... 398/176
7,116,915 B2 * 10/2006 Murai ........................ 398/176

OTHER PUBLICATIONS

H. Kim and A. H. Gnauck, "Experimental investigation of the performance limitation of DPSK systems due to nonlinear phase noise", IEEE Photon. Technol. Lett. 15, (2003), pp. 320-322.
C. Pare, A. Villeneuve, P. A. Belanger and N. J. Doran, "Compensating for dispersion and the nonlinear Kerr effect without phase conjugation," Opt. Lett. 21, (1996) pp. 459-461.
I. R. Gabitov and P. M. Lushnikov, "Nonlinearity management in a dispersion managed system," Opt. Lett. 27, (2002), pp. 113-115.

(Continued)

*Primary Examiner*—Hanh Phan
(74) *Attorney, Agent, or Firm*—Brian S. Steinberger; Phyllis K. Wood; Law Offices of Brian S. Steinberger, P.A.

(57) ABSTRACT

A regenerator for restoring the originally encoded optical phase of a differential-phase-shift-keyed signal. In an embodiment, the regenerator simultaneously provides limiting amplification and reduces amplitude noise based on a phase-sensitive optical amplifier that combines a weak signal field of a degraded input data with a strong pump field supplied by a local oscillator in a nonlinear interferometer. The two fields interact through degenerate four-wave mixing, and optical energy is transferred from the pump to the signal and vice versa. The phase sensitive nature of the optical gain leads to amplification of a specific phase component of the signal, determined by the input pump-signal phase difference and the incident signal phase is restored to two distinct states, separated by 180° according to the original encoding. Simultaneously, gain saturation of the pump wave by the signal wave results in limiting amplification of the signal wave for removing signal amplitude noise.

18 Claims, 5 Drawing Sheets

OTHER PUBLICATIONS

S. L. Jansen, D. van den Borne, G. D. Khoe, H. de Waardt, C. C. Monsalve, S. Spalter and P. M. Krummrich, "Reduction of nonlinear phase noise by mid-link spectral inversion in a DPSK based transmission system" in proc. OFC, OTh05, Anaheim CA, 2005.

X. Liu, X. Wei, R. E. Slusher and C. J. McKinstrie, "Improving transmission performance in differential phase-shift-keyed systems by use of lumped nonlinear phase-shift compensation," Opt. Lett. 27, (2002), pp. 1616-1618.

C. Xu and X. Liu, "Post-nonlinearity compensation with data-driven phase modulators in phase-shift keying transmission," Opt. Lett. 27, (2002), pp. 1619-1621.

A. Striegler and B. Schmauss, "All-Optical DPSK Signal Regeneration Based on Cross-Phase Modulation," IEEE Photon. Tech. Lett. 16, (2004), pp. 1083-1085.

A. Striegler, M. Meissner, K. Cvecek, K. Sponsel, G. Leuchs and B. Schmauss, "NOLM-Based RZ-DPSK Signal Regeneration," IEEE Photon. Technol. Lett. 17, (2005), pp. 639-641.

P. S. Devgan, M. Shin, V. S. Grigoryan, J. Lasri and P. Kumar, "SOA-based regenerative amplification of phase noise degraded DPSK signals," in proc. OFC, PDP34, Anaheim CA, (2005).

M. E. Marhic, C. H. Hsia and J. M. Jeong, "Optical Amplification in a nonlinear fiber interferometer," Electron. Lett. 27, pp. 210-211 (1991).

* cited by examiner

REGENERATION OF OPTICAL PHASE MODULATED SIGNALS

FIELD OF THE INVENTION

The present invention relates to the field of optical communications in general and in particular to systems, apparatus, devices, and methods for all-optical signal regeneration and optical processing of phase modulated signals in general and differential-phase-shift-keyed signals in particular.

BACKGROUND OF THE INVENTION

Differential phase-shift keying (DPSK) has become the format of choice for long-haul optical transmission systems, due to the 3-dB improvement in receiver sensitivity compared to on-off keying and enhanced tolerance to dispersion and nonlinear effects, particularly intrachannel four-wave mixing (FWM). DPSK systems with balanced detection can tolerate a large amount of amplitude noise compared to on-off keying since, in DPSK systems, errors occur only when pulse-to-pulse phase relationships deviate by more than $\pi/2$ from their original values, regardless of the amplitude at detection. Excluding timing jitter, the primary limitation of a DPSK transmission system is the accumulation of linear and nonlinear phase noise.

Linear phase noise results from imperfections in optical modulators and from amplified spontaneous emission in optical amplifiers. Nonlinear phase noise results from intra- and inter-channel nonlinearities such as self phase modulation and cross phase modulation that convert amplitude noise to phase noise, which is known as the Gordon-Mollenauer effect. As a result, amplitude noise from modulators, ASE, dispersion-induced pattern effects and nonlinearities such as inter-channel FWM all introduce nonlinear phase noise that limits system performance.

As described in H. Kim and A. H. Gnauck, "Experimental investigation of the performance limitation of DPSK systems due to nonlinear phase noise", IEEE Photon. Technol. Lett. 15, pp. 320-322 (2003), when the nonlinear contribution to phase noise becomes dominant the 3-dB improvement in receiver sensitivity for balanced DPSK detection can be lost, negating a major advantage of using DPSK over on-off keying.

Several techniques suggested for managing fiber nonlinearity are described in C. Pare, A. Villeneuve, P. A. Belanger and N. J. Doran, "Compensating for dispersion and the nonlinear Kerr effect without phase conjugation," Opt. Lett. 21, pp. 459-461 (1996); and I. R. Gabitov and P. M. Lushnikov, "Nonlinearity management in a dispersion managed system," Opt. Lett. 27, pp. 113-115 (2002).

Another technique is to reduce the accumulation of nonlinear phase noise, including mid-link spectral inversion as disclosed in S. L. Jansen, D. van den Borne, G. D. Khoe, H. de Waardt, C. C. Monsalve, S. Spalter and P. M. Krummrich, "Reduction of nonlinear phase noise by mid-link spectral inversion in a DPSK based transmission system," in proc. OFC, OTh05, Anaheim Calif., 2005. However these management schemes do not remove phase noise once it accumulates.

Post transmission nonlinear phase shift compensation (NLPSC) can effectively mitigate self phase modulation induced nonlinear phase noise as disclosed in X. Liu, X. Wei, R. E. Slusher and C. J. McKinstrie, "Improving transmission performance in differential phase-shift-keyed systems by use of lumped nonlinear phase-shift compensation," Opt. Lett. 27, pp. 1616-1618 (2002), and C. Xu and X. Liu, "Post-nonlinearity compensation with data-driven phase modulators in phase-shift keying transmission," Opt. Lett. 27, pps. 1619-1621, (2002), but does not correct for linear phase noise or the effects of inter-channel cross phase modulation.

To accomplish DPSK regeneration it is necessary to equalize the pulse relative amplitudes while simultaneously restoring the encoded differential phase shifts. So far, the topic of DPSK regeneration has been divided between schemes that address amplitude and phase regeneration independently, since several traditional amplitude regeneration techniques inherently degrade phase information.

Phase-preserving DPSK amplitude regeneration is described in C. Xu and X. Liu, "Post-nonlinearity compensation with data-driven phase modulators in phase-shift keying transmission," Opt. Lett. 27, pp. 1619-1621, (2002), is based on cross phase modulation combined with optical filtering described in A. Striegler and B. Schmauss, "All-Optical DPSK Signal Regeneration Based on Cross-Phase Modulation," IEEE Photon. Tech. Lett. 16, pp. 1083-1085 (2004), and using a modified nonlinear optical loop mirror (NOLM) as described in A. Striegler, M. Meisaner, K. Cvecek, K. Sponsel, G. Leuchs and B. Schmauss, "NOLM-Based RZ-DPSK Signal Regeneration," IEEE Photon. Technol. Lett. 17, pp. 639-641 (2005). However, these techniques have not been demonstrated experimentally.

Numerical analysis has shown that FWM-based amplitude regenerators are favorable for DPSK systems, since phase information can be preserved. See M. Matsumoto, "Regeneration of RZ-DPSK Signals by Fiber-Based All-Optical Regenerators," IEEE Photon. Technol. Lett. 17, pp. 1055-1057 (2005). Phase-regenerative amplification of a DPSK signal suffering only phase noise has been demonstrated in a combined Sagnac-SOA structure for an input Q-factor>14 dB as described in P. S. Devgan, M. Shin, V. S. Grigoryan, J. Lasri and P. Kumar, "SOA-based regenerative amplification of phase noise degraded DPSK signals," in proc. OFC, PDP34, Anaheim Calif., (2005).

The phase-sensitive amplifier (PSA) has emerged as an interesting candidate for optical amplification of both on-off keyed and DPSK signals. PSA's have been widely realized in nonlinear optical loop mirrors (NOLM) for amplification of high speed signals as disclosed in M. E. Marhic, C. H. Hsia and J. M. Jeong, "Optical Amplification in a nonlinear fiber interferometer," Electron. Lett. 27, pp. 210-211 (1991).

Phase-sensitive amplifiers offer the potential of providing signal gain with a noise figure less than the 3-dB quantum limit of phase-insensitive amplifiers as described in W. Imajuku, A. Takada and Y. Yamabayashi, "Inline coherent optical amplifier with noise figure lower than 3 dB quantum limit," Electron. Lett. 36, pp. 63-64 (2000).

PSA's also may act as limiting amplifiers as described in A. Takada and W. Imajuku, "Amplitude noise suppression using a high gain phase sensitive amplifier as a limiting amplifier," Electron. Lett. 32, pp. 677-679 (1996).

PSA's also show regenerative characteristics when they are used to store solitons in optical buffers as described in G. D. Bartolini, D. K. Serkland, P. Kumar and W. L. Kath, "All-Optical Storage of a Picosecond-Pulse Packet Using Parametric Amplification," IEEE Photon. Technol. Lett. 9, pp. 1020-1022 (1997).

Recently we proposed using a PSA for simultaneously regenerating both the amplitude and phase of a DPSK signal as disclosed in K. Croussore, C. Kim and G. Li, "All-optical regeneration of differential phase-shift keying signals based on phase-sensitive amplification," Opt. Lett. 28, 2357-2359

(2004), with the potential for restoring differential phase shifts to almost exactly 0 or π even for large values of input phase noise while restoring pulse amplitudes for >3-dB input amplitude noise. Two regimes of operation for the PSA-based DPSK regenerator were discussed: an un-depleted pump PSA, which performs nearly ideal phase-only regeneration, and a depleted-pump PSA that would combine phase and amplitude regeneration.

SUMMARY OF THE INVENTION

A primary objective of the present invention is to provide systems, apparatus, devices and methods of all optical regeneration of phases of optical phase modulated signals including differential phase-shift keying signals based on phase-sensitive amplification. In this method, only desired phase-state optical signal vectors are preferentially amplified leading to phase regeneration.

A secondary objective of the present invention is to provide systems, apparatus, devices and methods for phase-only regeneration, in which the originally encoded differential phase shifts of the optical pulses are restored.

A third objective of the present invention is to provide systems, apparatus, devices and methods for simultaneous phase and amplitude regeneration, which combines the phase regeneration property with limiting amplification in a single device. Limiting amplification is achieved through the same process as phase regeneration (i.e. degenerate four-wave mixing), by choosing the amplifier parameters such that the signal gain saturates.

A fourth objective of the present invention is to provide systems, apparatus, devices and methods for cascaded phase and amplitude regeneration, which combines the ideal phase regeneration results of an un-depleted pump PSA with a phase preserving limiting amplifier providing amplitude regeneration in separate nonlinear devices (or cascaded in the same device). The phase-regenerated signal serves as the input to the limiting amplifier, resulting in simultaneously minimized amplitude and phase noise at the output.

The systems, apparatus, devices and methods of the present invention regenerate (in the optical domain) both the amplitude and phase of a degraded DPSK signal, based on the phase sensitive optical amplifier. Both linear and non-linear contributions to phase noise are removed. Phase sensitive amplifiers (PSAs) perform degenerate four-wave mixing in a nonlinear fiber interferometer. The phase sensitive nature of the optical gain forces the signal (degraded data) phase to a value of 0 or π relative to a strong pump at the same frequency. Simultaneously, when the signal power becomes comparable to the pump power the gain saturates and limiting amplification is achieved.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

The following is a list of the reference numbers used in the drawings an the detailed specification to identify components:

| | |
|---|---|
| 100 | phase-sensitive amplifier |
| 105 | first directional coupler |
| 110 | optical carrier recovery |
| 120 | local oscillator |
| 130 | optical amplifier |
| 140 | temporal delay |
| 150 | variable attenuator |
| 155 | second directional coupler |
| 160 | Mach-Zehnder interferometer |
| 161 | optical fiber $E_1$ |
| 162 | optical fiber $E_2$ |
| 165 | third directional coupler |
| 170 | signal port |
| 175 | pump port |
| 200 | cascaded phase-amplitude regenerator |
| 205 | first directional coupler |
| 210 | optical carrier recovery |
| 220 | local oscillator |
| 230 | first optical amplifier |
| 240 | temporal delay |
| 250 | variable attenuator |
| 255 | second directional coupler |
| 260 | Mach-Zehnder interferometer |
| 270 | first signal port |
| 330 | second optical amplifier |
| 355 | second directional coupler |
| 360 | second Mach Zehnder interferometer |

The method, system, apparatus and device of the present invention uses differential phase shift-keying (DPSK) as an example of a phase modulated optical signal. Phase regeneration of optical differential phase-shift keying signals is achieved in the undepleted pump regime while simultaneous amplitude and phase regeneration can be realized in the depleted-pump regime.

In the DPSK modulation format, information is encoded by changing the relative phase of adjacent optical pulses by either 0 or 180 degrees. For example, a pulse-to-pulse phase change of 0 degrees may signify a binary "1" while a phase change of 180 degrees may signify a binary "0". At the transmitter, only these two phase states are present, however after the signal propagates through an optical fiber the relative phase shifts between adjacent pulses are changed. There are two contributions to this introduced phase noise: linear phase noise is added by optical amplifiers. Nonlinear phase noise arises from nonlinear optical effects such as self and cross phase modulation. Amplitude noise added by optical amplifiers is converted to nonlinear phase noise through these effects. The DPSK regenerator is required to modulate the optical phase of each pulse in a manner that restores the original pulse-to-pulse phase change to either 0 or 180 degrees. Amplitude noise is also introduced through propagation in fiber optic systems; the DPSK regenerator must be able to reduce or eliminate amplitude noise without degrading the encoded pulse-to-pulse phase relationships.

The present invention provides a method for regenerating (in the optical domain) both the amplitude and phase of a degraded DPSK signal, based on the phase sensitive optical amplifier. Both linear and nonlinear contributions to phase noise are removed. Phase sensitive amplifiers (PSAs) perform degenerate four-wave mixing in a nonlinear fiber interferometer. The phase sensitive nature of the optical gain forces the signal (degraded data) phase to a value of 0 or $\pi$ relative to a strong pump at the same frequency. Simultaneously, when the signal power becomes comparable to the pump power the gain saturates and limiting amplification is achieved.

The systems, apparatus, devices and method of the present invention include three embodiments, or modes of operation of the DPSK regenerator. In a first embodiment, using phase-only regeneration, the originally encoded differential phase shifts of the optical pulses are restored. In a second embodiment, simultaneous phase and amplitude regeneration, which combines the phase regeneration property with limiting amplification in a single device, is used. Limiting amplification is achieved through the same process as phase regeneration (i.e. degenerate four-wave mixing), by choosing the amplifier parameters such that the signal gain saturates by the end of the nonlinear amplifying medium. In the third embodiment, cascaded phase and amplitude regeneration, which combines the ideal phase regeneration results with the limiting amplification characteristics in separate nonlinear interferometers, or cascaded in the same interferometer, is used. In a third embodiment, the phase-regenerated signal serves as the input to a limiting amplifier, resulting in simultaneously minimized amplitude and phase noise at the output.

Figure 1:
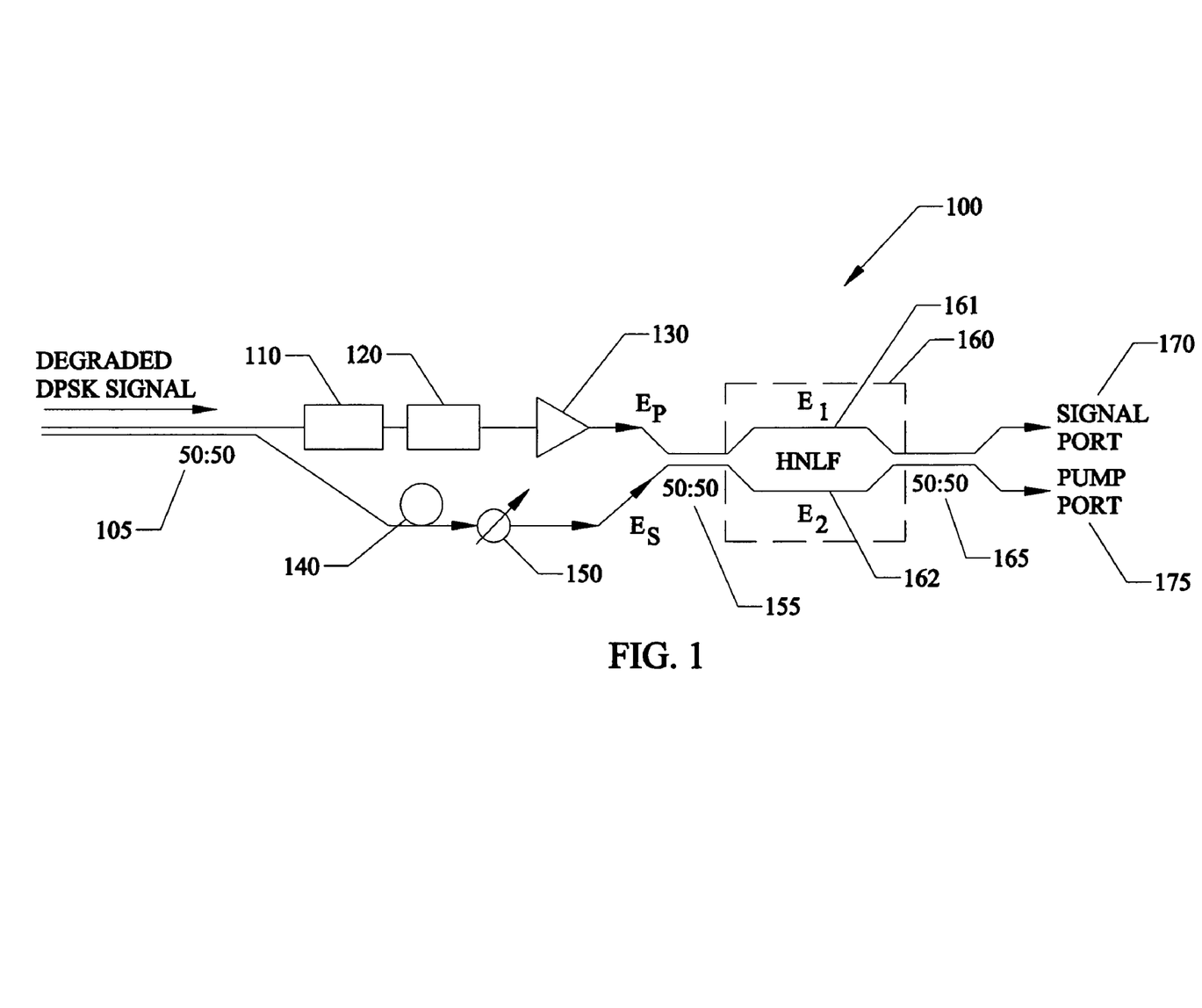
FIG. 1 shows a schematic of the differential phase-shift keying regenerator of the present invention.
Figure 2:
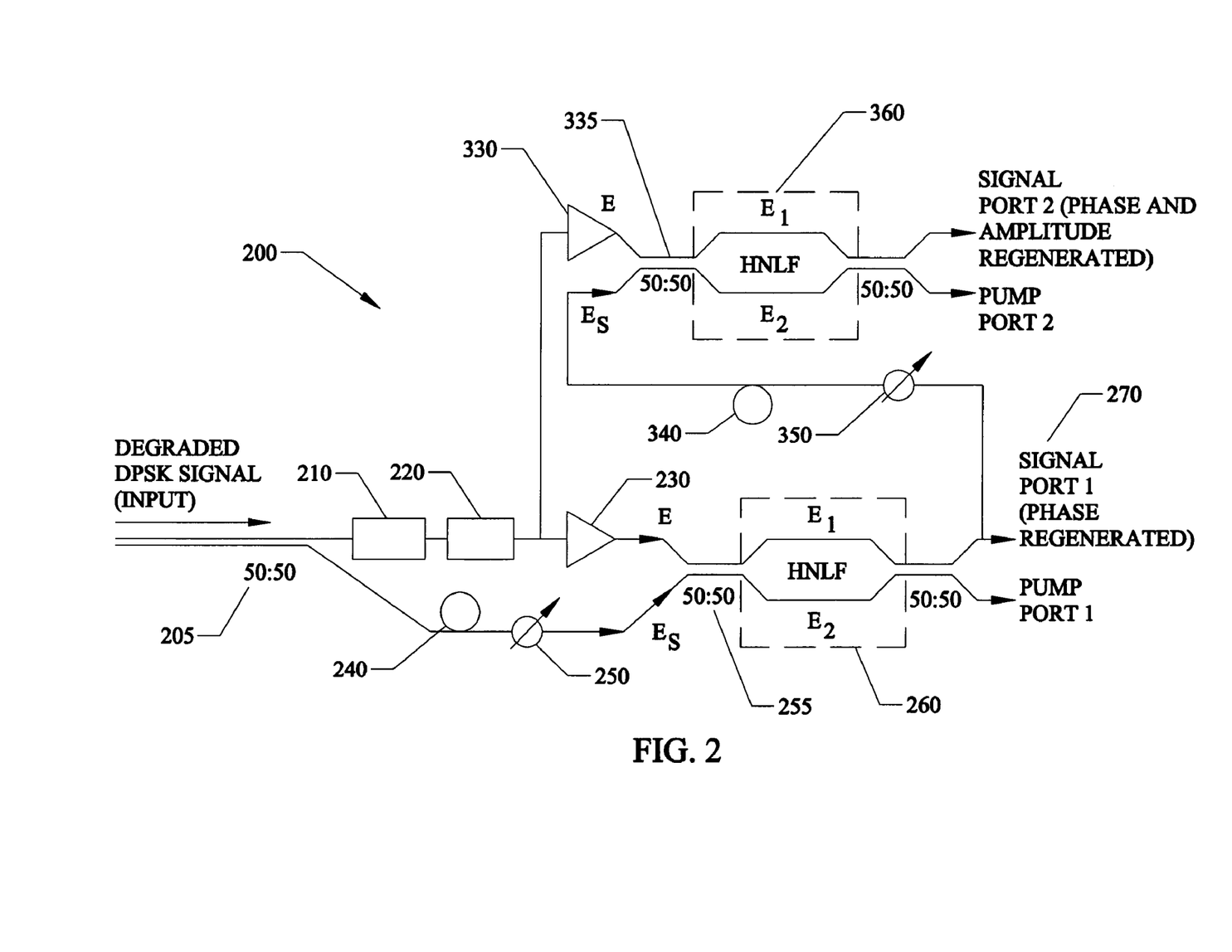
FIG. 2 shows a schematic of the cascaded phase-amplitude differential phase-shift keying regenerator.

FIG. 1 shows a schematic of the differential phase-shift keying (DPSK) regenerator of the present invention. The invention provides systems, devices, apparatus and methods for regenerating both the phase and amplitude of a degraded DPSK optical signal based on the phase sensitive optical amplifier. FIG. 1 shows an example of a phase-sensitive amplifier 100 configured for use with the present invention. The configuration shown can be used for performing phase-only regeneration or simultaneous phase and amplitude regeneration. A schematic for a cascaded phase-amplitude regenerator 200 is shown in FIG. 2.

Referring back to FIG. 1, a degraded DPSK signal enters the regenerator 100 from the left. In this example, the degraded signal exhibits amplitude noise, as well as inter and intra-bit phase noise. Inter-bit phase noise occurs when the pulse-to-pulse phase difference is no longer 0 or 180 degrees as was originally encoded. Intra-bit phase noise refers to phase fluctuations that occur within a single bit period. The degraded signal is divided into two signals using a 50:50 directional coupler 105. The pump is generated in the upper path in three steps, beginning with optical carrier recovery 110. The carrier-enhanced signal is used to injection-lock a pulsed or continuous wave (CW) local oscillator 120 that is the pump source. Pump light exiting the local oscillator 120 is then amplified by the optical amplifier 130 to the appropriate power level.

A continuous wave pump source is advantageous for phase-only regeneration because it assures uniformity of the output phase over the entire bit period. A pulsed pump source is advantageous for simultaneous phase and amplitude regeneration to provide a good output signal pulse shape.

In the lower arm, the original degraded DPSK signal is preserved. A time delay device 140 is required to synchronize the pump and signal pulses at the second 50:50 coupler 155, and a variable attenuator 150 is required to select the proper signal average power for achieving regeneration. The pump output $E_p$ and signal $E_s$, which are at the same optical frequency, are then combined in the input coupler. The second directional coupler 155 divides the combined signal into two signals $E_1$ and $E_2$, which are input into a balanced nonlinear Mach-Zehnder interferometer 160, each arm 161 and 162 of which may be comprised of highly nonlinear optical fiber, photonic crystal fiber or periodically-poled Lithium Niobate. In the absence of the signal (pump) field, the pump (signal) emerges completely from the pump (signal) port 175 (170). When both the pump and signal are present, the total fields in the two arms are $$E_1 = \frac{1}{\sqrt{2}} \cdot (Ep(0) + i \cdot Es(0))$$

and $$E_2 = \frac{1}{\sqrt{2}} \cdot (i \cdot Ep(0) + Es(0)).$$

The fields experience different nonlinear phase shifts, and the interferometer 160 becomes unbalanced. As a result, energy from the pump is transferred to the signal port and vice versa. Neglecting loss, the output at the signal port 170 is given by $$E_{s,out} = i^{i \cdot \Phi_0} \cdot i \cdot [Epo \cdot e^{i\phi_{po}} \cdot \sin(\phi_{nl}) + Eso \cdot e^{i\Phi_{so}} \cdot \cos(\phi_{nl})] \quad (1)$$

where $\Phi^0 = \gamma(L/2)(|E_{po}|^2 + |E_{so}|^2)$, L is the amplifier length, $\Phi_{po}$ and $\Phi_{so}$ are the injected pump and signal phases respectively, $\gamma$ is the fiber nonlinear coefficient and $\Phi_{nl} = \gamma L |E_{po}||E_{so}| \sin(\Phi_{po} - \Phi_{so})$ is the nonlinear phase shift. From Eq. (1), it follows that the output signal peak power $P_s$ is given by $$P_{s,out} = Ppo \cdot \sin(\phi_{nl})^2 + Pso \cdot \cos(\phi_{nl})^2 + \sqrt{Ppo \cdot Pso} \cdot \sin(2\phi_{nl}) \cdot \cos(\Phi_{po} - \Phi_{so}) \quad (2)$$

where $P_{so} = |E_{so}|^2$ and $P_{po} = |E_{po}|^2$ are the input pump and signal powers. From Eqs. (1) and (2) it is straightforward to verify that the coupling between the pump and signal is phase sensitive. When the input phase difference is $\pi/2$ or $3\pi/2$ the nonlinear phase shift reaches the maximum value. On the other hand if the pump and signal are in phase or out of phase by $\pi$, the nonlinear phase shift vanishes and there is no coupling between the pump and signal. The signal gain, determined by the nonlinear phase shift, is affected by the choice of amplifier length and input powers, as well as the input phase difference. When the nonlinear phase shift reaches a value of π/2, the signal output power is equal to the input pump power.

Figure 3:
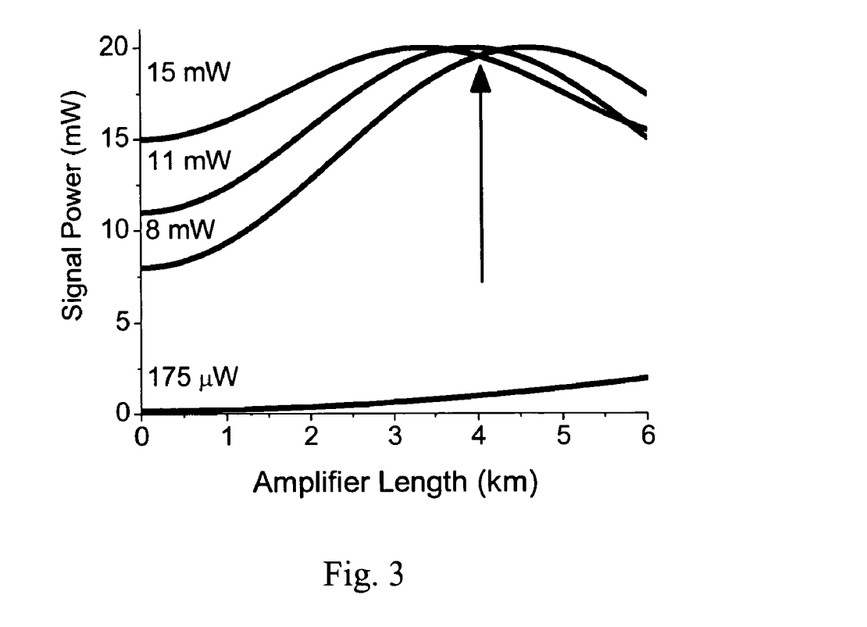
FIG. 3 shows signal power vs. amplifier length for different input signal powers.

As shown in FIG. 3, the output power at the signal port 170 is plotted as a function of amplifier length for different values of input signal power wherein the pump power is 20 mW. The arrow points to the amplifier length for simultaneous phase and amplitude regeneration, approximately 4 km in this example. The lowest trace corresponds to the undepleted pump case, which is used for phase-only regeneration; the amplifier length would be selected at approximately 6 km. The calculations for this example were calculated with the use of a highly nonlinear optical fiber as the amplifying medium (rather than PPLN or photonic crystal fiber) and use $\gamma=27$ $W^{-1}km^{-1}$. Two regimes of phase-sensitive amplification result.

For the case of low input signal power, $\Phi_{NL} \ll 1$ and the output signal power remains small compared to the pump power, indicating an un-depleted pump and shown in FIG. 3 as the lower trace. For high input signal power, the upper trace in FIG. 3, the output signal power reaches the level of the input pump power, a depleted pump, and oscillates with distance. The four-wave-mixing (FWM) length, defined as the fiber length at which the signal power reaches its maximum value, decreases as the input signal power increases. Both undepleted- and depleted-pump phase-sensitive amplification can be used to perform DPSK regeneration. The undepleted-pump phase-sensitive amplification leads to approximately perfect phase regeneration while the depleted pump phase-sensitive amplification achieves simultaneous phase and amplitude regeneration.

Figure 4:
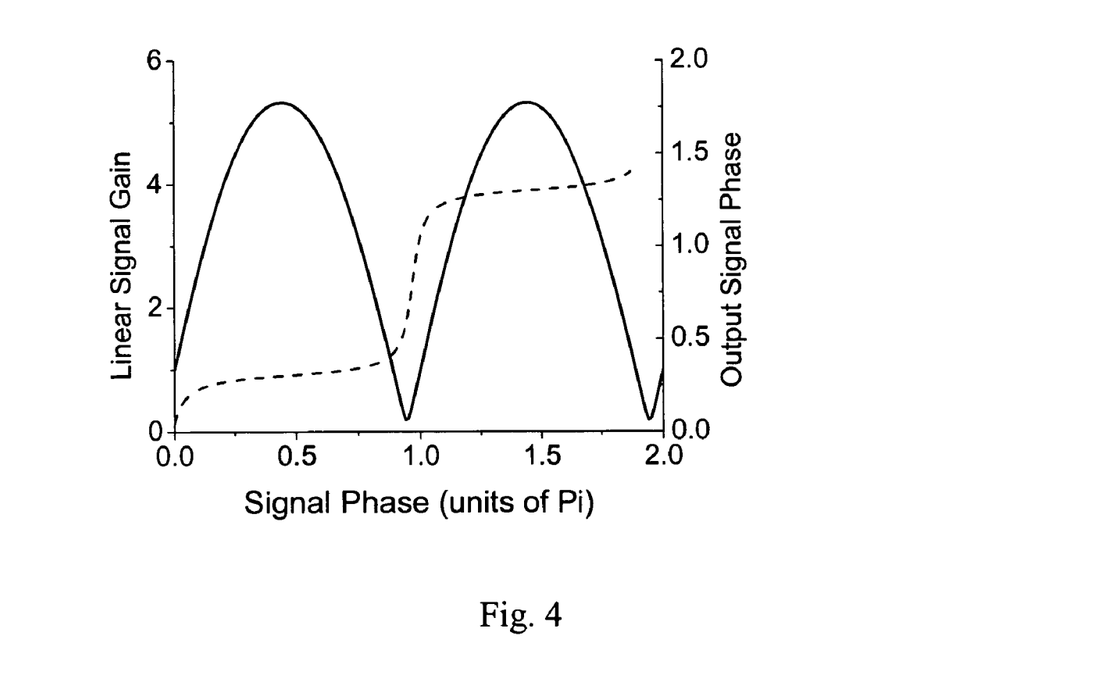
FIG. 4 shows signal field gain vs. pump-signal phase difference (solid line), and output phase vs. input pump-signal phase difference (dotted line).

FIG. 4 shows signal field gain vs. pump-signal phase difference (solid line), and output phase vs. input pump-signal phase differences (dotted line). The regeneration of DPSK signals in the undepleted-pump regime is used for this example. FIG. 4 shows the normalized field gain, defined as $|E_{s,out}|/|E_{s,in}|$, as a function of the relative pump-signal phase, wherein the pump and signal input powers are $P_{po}=20$ mW and $P_{so}=175$ µW, respectively, and the amplifier length is L=6 km, compared to a FWM length of nearly 35 km. The peaks in the gain curve occur at multiples of π/2, signifying these field components are amplified strongly, while those in phase or out of phase by π are not amplified. The phase dependent gain forces the output phase of the DPSK signal pulses to be approximately 0 or π, depending on the initial quadrant in which the pulse phase lies.

The output signal phase vs. input signal phase relative to that of the pump for the undepleted-pump PSA is also shown in FIG. 4. As seen by the graph, the output phase of the signal is forced to an approximately constant value for large variations of input signal phase. The difference between the two output phase states is verified to be π, indicating all regenerated signal pulses have a differential phase shift of either 0 or π. To further illustrate these results regeneration of a $40$ $Gb/s$ DPSK signal after transmission in fiber is also disclosed.

Figure 5A:
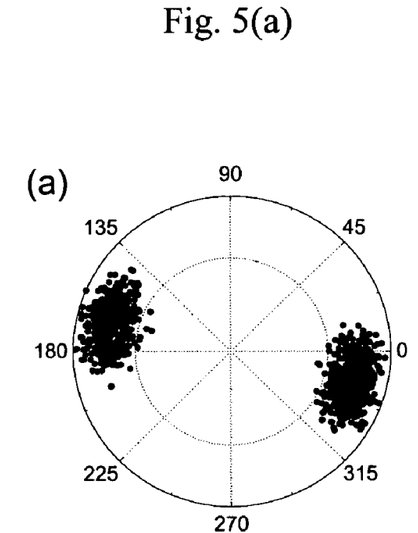
FIG. 5a shows constellation diagrams of differential phase-shift keying data after 500 km transmission.

FIG. 5(a) is a constellation diagram showing degraded DPSK data after transmission through five spans of a dispersion compensated system, where each span consists of 80 km of standard single mode fiber (d=16 ps/nm/km, α=0.2 dB/km) followed by 16 km of dispersion compensating fiber (D=−80 ps/nm/km, α=0.5 dB/km), and a single erbium doped fiber amplifier with a noise figure of 6. On the phasor diagram, each point represents the amplitude and phase of a DPSK bit sampling at the center of the bit period.

Figure 5B:
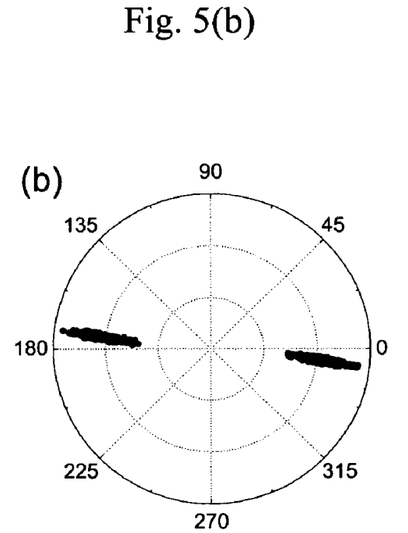
FIG. 5b shows constellation diagrams of differential phase-shift keying data transmission after phase-only regeneration.

The degree of amplitude noise is greater than 3 dB, and the total phase variation is nearly 60°. FIG. 5(b) shows the same data after phase regeneration, using the parameters of FIG. 4. The amplitude noise is not affected, but the output phase states have a difference of π, thus achieving approximately ideal phase regeneration.

When the amplifier length is selected approximately near the FWM length, limiting amplification can be obtained as shown in FIG. 3. At an amplifier length of about 4 km (as shown by the arrow), the signal output power is almost independent of the input power (from 5 to 15 mW) when we choose. If the pump-signal phase difference is not exactly π/2, both the FWM length and the maximum signal power changes. For a DPSK signal suffering both amplitude and phase noise, the amplitude regeneration property of the PSA (for the fixed amplifier length of 4 km) needs to be verified.

Figure 6:
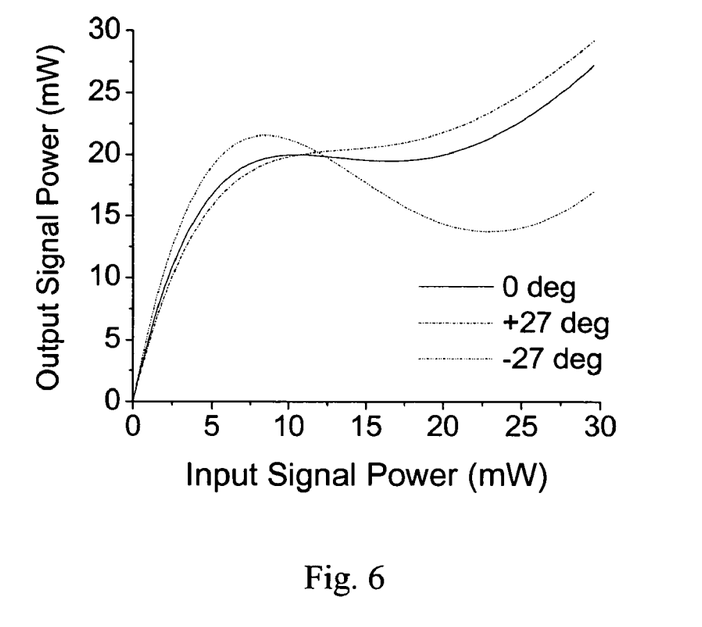
FIG. 6 shows signal output power vs. signal input power for different values of pump-signal input phase mismatch.

The graph shown in FIG. 6 plots the signal output power vs. signal input power for different values of pump-signal phase mismatch. Limiting amplification is observed for signal powers greater than about 5 mW. The inset graph shows that for an input signal power range of 4.75 dB, at approximately 5 to approximately 15 mW, the output power varies by less than 2.5 dB, and by much less than 1 dB when the pump-signal phase mismatch is less than 15°.

Figure 7:
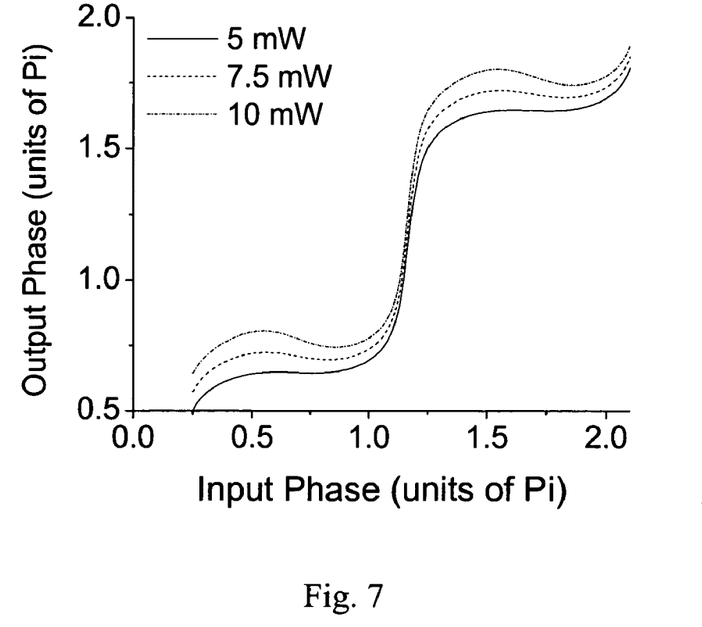
FIG. 7 shows output signal phase vs. input pump-signal phase mismatch in units of π for different input signal powers.

To illustrate simultaneous phase regeneration for the depleted pump case, in FIG. 7 output phase vs. input relative phase is plotted for signal powers of approximately 5 to 10 mW. In the presence of input amplitude noise the phase regeneration properties of the depleted pump PSA are not ideal, with output phase noise limited by the inherent conversion of amplitude noise to phase noise by the PSA. However when very large ratios of input pump to signal power are utilized this contribution to output phase noise can be significantly reduced.

Figure 5C:
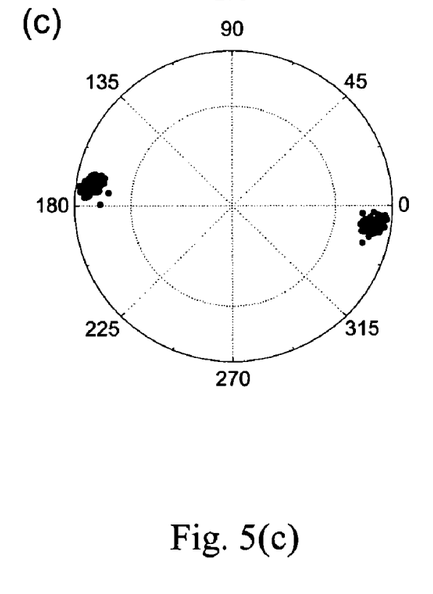
FIG. 5c shows constellation diagrams of differential phase-shift keying data after simultaneous phase and amplitude regeneration.

FIG. 5(c) shows the degraded data of FIG. 5(a) after simultaneous phase and amplitude regeneration. Amplitude noise is reduced to approximately 1 dB and the phase only varies by approximately 12° overall, in comparison to the initial 60° overall variation shown in FIG. 5(a).

Cascaded phase-amplitude regeneration can be performed using the configuration shown in FIG. 2. As discussed in regard to the regenerator 100 shown in FIG. 1, the front end of the cascaded phase-amplitude DPSK regenerator 200 includes a first directional coupler 205 that divides the incoming degraded DPSK signal into two signals. The first arm includes optical carrier recovery apparatus 210 followed by local oscillator 220. The signal is amplified by optical amplifier 230 for use in the first interferometer 260 and amplified by optical amplifier 330 for use in the second interferometer 360. A time delay device, temporal delay 240, is required to synchronize the pump and signal pulses at the second 50:50 coupler 255 and a variable attenuator 250 is required to select the proper signal average power for achieving regeneration.

In this example, the phase-regenerated output from the first nonlinear interferometer 260 at signal port 270 is used as the input signal for the second nonlinear interferometer 360. The two interferometers 260 and 360 have different lengths and utilize different input pump powers corresponding to optical amplifiers 230 and 330, respectively, and the signal powers are adjusted in each case to maximize phase first and then amplitude regeneration. Pump light may originate from a single source, local oscillator 220, as shown, when the proper optical delays, temporal delays 240 and 340, are set for the signal before each interferometer 260 and 360.

The parameters used to produce the results shown in FIG. 5(b) can be modified to further improve the phase regeneration results, specifically by selecting a longer amplifier length or a higher pump power, so that the output phase noise from the first regenerator in the lower arm is negligible.

In the limit of zero phase noise, the amplitude regeneration characteristics of the second amplifier 330, upper arm, are greatly improved, as can be seen by considering the results shown in FIG. 6 for the case of equal input pump and signal phase. For this case, there is no phase noise to amplitude noise conversion in the second amplifier 330 and the amplitude noise at the output is determined only by the amplitude noise at the input and the flatness of the regeneration curve in FIG. 6. As a result, the output amplitude noise is minimized.

Figure 5D:
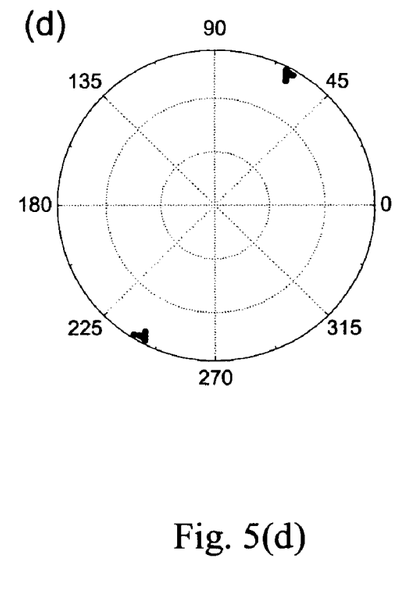
FIG. 5d shows constellation diagrams of differential phase-shift keying data after cascaded phase-then-amplitude regeneration.

The output phase noise is governed by amplitude noise to phase noise conversion in the second amplifier 330 and can be ascertained from FIG. 7 wherein the pump phase is set to 0 radians, amplifier length is 4 km and pump power is 20 mW. In the figure a small ratio of pump to signal power is used in conjunction with smaller pump powers. For better phase regeneration performance in the cascaded scheme based on two PSAs a larger ratio would be used to minimize the output phase noise. FIG. 5(*d*) shows the degraded data of FIG. 5(*a*) after cascaded phase-amplitude regeneration.

In summary, An all-optical regenerator that will restore the originally encoded optical phase of a differential-phase-shift-keyed signal while simultaneously provided limiting amplification, and reducing amplitude noise, based on a phase-sensitive optical amplifier is described. A phase sensitive amplifier combines a weak signal field of the degraded DPSK data with a strong pump field supplied by a local oscillator in a nonlinear interferometer, such as a Mach-Zehnder interferometer comprising highly nonlinear fiber.

The two fields interact through degenerate four-wave mixing, and optical energy is transferred from the pump to the signal and vice versa. The phase sensitive nature of the optical gain leads to amplification of a specific phase component of the signal, determined by the input pump-signal phase difference. As a result, the incident signal phase can be restored to two distinct states, separated by 180° according to the original encoding. Simultaneously, when the amplifier parameters are properly chosen, gain saturation of the pump wave by the signal wave results in limiting amplification of the signal wave, providing the means for removing signal amplitude noise.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An apparatus for optical regeneration comprising:
    a first coupler for dividing an incoming degraded optical phase modulated signal into a first and a second degraded optical signal;
    an optical pump source connected to a first arm of said first coupler for receiving said first degraded optical signal, wherein said optical pump source is locked to the phase of said first degraded optical signal and generated a pump output;
    a first synchronization circuit connected to a second arm of said first coupler for receiving said second degraded optical signal and synchronizing said second degraded optical signal with said pump output, said first synchronization circuit comprises:
        a first delay device for delaying said second degraded optical signal; and
        a first attenuator connected with said first delay device for selecting a signal average power of said delayed second optical signal to achieve regeneration;
    a first coupling device for combining said pump output and said synchronized second degraded optical signal into a third and a fourth optical signal; and
    a first interferometer for receiving said third and said fourth optical signal to generate a phase regenerated signal, wherein said first interferometer includes a nonlinear optical material to provide phase regeneration of said incoming degraded optical phase modulated signal.

2. The apparatus of claim 1 wherein said optical pump source comprises:
    an optical carrier recovery device for receiving said first degraded optical signal and recovering an optical carrier from said first degraded optical signal to generate a carrier enhanced signal;
    a oscillator serially connected with said optical recovery device for receiving said carrier enhanced signal and using said carrier enhanced signal to injection lock said oscillator, wherein said oscillator generates said pump output; and
    a first amplifier connected with said oscillator for receiving and amplifying said pump output to produce an amplified pump output.

3. The apparatus of claim 2 further comprising:
    a second amplifier connected with said oscillator for receiving and amplifying said pump output to a second power level to produce a second amplified pump output;
    a second synchronizing circuit connected with an output of said first interferometer for synchronizing said phase regenerated signal with said second amplified pump output signal;
    a second coupling device connected with said second amplifier and said second synchronizing circuit for combining said second amplified pump output and said synchronized phase regenerated signal and dividing said combined signal into a fifth optical signal and a sixth optical signal; and
    a second nonlinear interferometer connected with said second coupling device to receive said fifth and said sixth optical signals and generates a phase and amplitude regenerated signal, wherein said apparatus combines phase regeneration with amplitude regeneration in a single device.

4. The apparatus of claim 1 wherein said first interferometer comprises:
    a first arm and a second arm for receiving said third and said fourth optical signal from said coupling device wherein said third and said fourth optical signal interact and optical energy is transferred for amplification of a specific phase component of the degraded optical phase modulated signal, and an incident signal phase is restored to two distinct states, separated by 180° according to an original encoding.

5. The apparatus of claim 1 wherein said first inteferometer comprises:
    a nonlinear interferometer to provide degenerate four-wave mixing to achieve phase-only regeneration.

6. The apparatus of claim 5 wherein said first interferometer comprises:
a polarization-maintaining optical fiber material.

7. The apparatus of claim 5 wherein said nonlinear interferometer comprises:
a photonic crystal fiber material.

8. The apparatus of claim 5 wherein said nonlinear interferometer comprises:
a periodically-poled Lithium Niobate material.

9. The apparatus of claim 1 wherein said optical pump source comprises:
a continuous wave pump source for phase-only regeneration of said incoming degraded phase modulated optical signal.

10. The apparatus of claim 1 wherein said optical pump source comprises:
a pulses pump source for simultaneous phase and amplitude regeneration of said incoming degraded phase modulated optical signal.

11. The apparatus of claim 1 wherein said incoming degraded optical phase modulated signal includes at least one phase level.

12. A system comprising:
an optical carrier recovery device for recovering an optical carrier of an incoming degraded optical phase modulated encoded signal;
an optical pump source serially connected with said optical carrier recovery device for locking a phase of the incoming optical phase modulated signal to produce a pump output;
a first synchronizer coupled with said optical pump source for synchronizing said pump output and said incoming degraded optical phase modulated signal;
a nonlinear interferometer coupled with said optical pump source and said synchronizer for receiving said synchronized pump output and said incoming phase modulated optical signal to recover said optical phase modulated signal, wherein a phase is stored to one of two distinct states, separated by 180° according to an original encoding;
a second synchronizer coupled with said first nonlinear interferometer for synchronizing said phase regenerated signal with said pump output; and
a second cascaded nonlinear interferometer for providing limiting amplification for regenerating the amplitude of said optical phase modulated signal.

13. The system of claim 12 wherein said optical pump source comprises:
one of a pulsed laser and a continuous wave laser.

14. A method for regenerating a phase modulated optical signal comprises the steps of:
dividing an incoming degraded phase modulated optical signal into a first and a second degraded optical signal;
recovering a carrier and phase of the first degraded optical signal to produce a pump output;
phase locking the phase of the first degraded optical signal with an optical pump source comprising the steps of:
recovering an optical carrier from said first degraded optical signal to produce a carrier enhanced signal;
using said carrier enhanced signal to injection lock an oscillator to generate said pump output; and
amplifying said pump output;
synchronizing said second degraded optical signal with said pump output; and
combining the synchronized second optical signal with the pump output; and
regenerating originally encoded differential phase shifts of optical pulses for phase regeneration of said incoming degraded phase modulated optical signal.

15. The method as described in claim 14 where phase-sensitive amplification is provided by parametric amplification.

16. The method of claim 14, further comprising the steps of:
synchronizing said phase regenerated signal with said pump output;
using said phase regenerated signal and using limiting amplification to regenerate the amplitude of said originally encoded optical pulses for amplitude regeneration.

17. An apparatus for optical regeneration comprising:
a first coupler for dividing an incoming degraded optical phase modulated signal into a first and a second degraded optical signal;
an optical pump source connected to a first arm of said first coupler for receiving said first degraded optical signal, wherein said optical pump source is locked to the phase of said first degraded optical signal and generated a pump output;
a first synchronization circuit connected to a second arm of said first coupler for receiving said second degraded optical signal and synchronizing said second degraded optical signal with said pump output, said optical pump source comprises:
an optical carrier recovery device for receiving said first degraded optical signal and recovering an optical carrier from said first degraded optical signal to generate a carrier enhanced signal;
a oscillator serially connected with said optical recovery device for receiving said carrier enhanced signal and using said carrier enhanced signal to injection lock said oscillator, wherein said oscillator generates said pump output; and
a first amplifier connected with said oscillator for receiving and amplifying said pump output to produce an amplified pump output;
a first coupling device for combining said pump output and said synchronized second degraded optical signal into a third and a fourth optical signal; and
a first interferometer for receiving said third and said fourth optical signal to generate a phase regenerated signal, wherein said first interferometer includes a nonlinear optical material to provide phase regeneration of said incoming degraded optical phase modulated signal.

18. The apparatus of claim 17 further comprising:
a second amplifier connected with said oscillator for receiving and amplifying said pump output to a second power level to produce a second amplified pump output;
a second synchronizing circuit connected with an output of said first interferometer for synchronizing said phase regenerated signal with said second amplified pump output signal;

a second coupling device connected with said second amplifier and said second synchronizing circuit for combining said second amplified pump output and said synchronized phase regenerated signal and dividing said combined signal into a fifth optical signal and a sixth optical signal; and a second nonlinear interferometer connected with said second coupling device to receive said fifth and said sixth optical signals and generates a phase and amplitude regenerated signal, wherein said apparatus combines phase regeneration with amplitude regeneration in a single device.

* * * * *